(12) United States Patent
Ahmad et al.

(10) Patent No.: US 6,912,403 B2
(45) Date of Patent: Jun. 28, 2005

(54) METHOD AND APPARATUS FOR FAST FORWARD-LINK POWER CONTROL AND SYNCHRONIZATION OF BASE STATIONS

(75) Inventors: Azeem Ahmad, Plano, TX (US); Ashvin H. Chheda, Plano, TX (US)

(73) Assignee: Nortel Networks Limited, St. Laurent (CA)

( * ) Notice: Subject to any disclaimer, the term of this patent is extended or adjusted under 35 U.S.C. 154(b) by 764 days.

(21) Appl. No.: 09/751,464

(22) Filed: Dec. 29, 2000

(65) Prior Publication Data

US 2002/0086693 A1 Jul. 4, 2002

Related U.S. Application Data

(60) Provisional application No. 60/210,703, filed on Jun. 9, 2000.

(51) Int. Cl.[7] .............................. H04B 7/00; H04Q 7/20
(52) U.S. Cl. ......................... 455/522; 455/69; 455/561; 455/127.1
(58) Field of Search .......................... 455/522, 69, 445, 455/561, 127.1, 127.2, 67.11, 68, 70, 517, 507; 370/331.2, 248, 252

(56) References Cited

U.S. PATENT DOCUMENTS

| | | | | |
|---|---|---|---|---|
| 5,893,035 A | * | 4/1999 | Chen ........................... | 455/522 |
| 6,058,107 A | * | 5/2000 | Love et al. ................... | 455/522 |
| 6,351,650 B1 | * | 2/2002 | Lundby et al. .............. | 455/522 |
| 6,393,276 B1 | * | 5/2002 | Vanghi ........................ | 455/522 |
| 6,510,319 B2 | * | 1/2003 | Baum et al. ................. | 455/522 |

* cited by examiner

Primary Examiner—Nay Maung
Assistant Examiner—John J. Lee
(74) Attorney, Agent, or Firm—Garlick Harrison & Markison, LLP; James A. Harrison

(57) ABSTRACT

A method and apparatus for controlling forward gain transmission values of a base station transceiver system includes adjusting forward gain values according to mobile station power control commands as well as to forward gain values commanded by a base station controller. The forward gain values commanded by a base station controller are used as an input to determining what the forward gain value should be and are not implemented exactly as commanded. Thus, a base station transceiver system formed according to the present invention examines the power control commands received by a mobile station relative to a power gain command received by the base station controller. For example, if the power gain command received from the base station controller is responsive to a forward gain value that was transmitted in the past, when a plurality of power control commands were received in the interim, the plurality of power control commands are accounted for as well as the forward gain value commanded by the base station controller when determining the actual forward gain value for the next transmission. Additionally, subsequent power gain commands are also compared to prior power gain commands wherein subsequent adjustments are only made based on the differences between them.

20 Claims, 7 Drawing Sheets

| | SEQ. | REPORTED VALUE | MS PWR CTRL CMD | RESULTING VALUE | BSC GAIN COMMND | DIFFER-ENCE | RELATV DELTA | OUTPUT PWR GAIN |
|---|---|---|---|---|---|---|---|---|
| 636 → | 0 | 3 | 1 | 4 | - | - | - | 4 |
| 640 → | 1 | 4 | 1 | 5 | - | - | - | 5 |
| 644 → | 2 | 5 | 0 | 4 | - | - | - | 4 |
| 648 → | 3 | 4 | 1 | 5 | - | - | - | 5 |
| 656 → | 4 | 5 | -1 | 4 | 9(0) | 6(0) | 6 | 10 |
| 660 → | 5 | 10 | -1 | 9 | 9(1) | 5(1) | -1 | 8 |
| 664 → | 6 | 8 | -1 | 7 | 10(2) | 5(2) | 0 | 7 |
| 668 → | 7 | 7 | 1 | 8 | 10(3) | 6(3) | 1 | 9 |
| 672 → | 8 | 9 | - | - | - | - | - | - |

FIG. 6

METHOD AND APPARATUS FOR FAST FORWARD-LINK POWER CONTROL AND SYNCHRONIZATION OF BASE STATIONS

CROSS REFERENCE TO RELATED APPLICATIONS

This application claims priority under 35 USC Section 119(b) and incorporates by reference the following Provisional Application for Patent entitled *Robust Synchronization Mechanism for Fast Forward Link Power Control*, having a Ser. No. of 60/210,703, said application having a filing date of Jun. 19, 2000.

BACKGROUND

1. Field of the Invention

The present invention relates generally to communications systems and particularly to power control in a code division multiple access communication system.

2. Description of Related Art

Because the radio frequency (RF) spectrum is limited, the government, more particularly, the Federal Communications Commission (FCC), governs the use of the radio frequency spectrum. This regulation includes deciding frequency band allocation among the various industries. Since the RF spectrum is limited, only a small portion of the spectrum can be assigned to each industry. Accordingly, the assigned spectrums must be used efficiently in order to allow as many frequency users as possible to have access to the spectrum.

Because the number and size of frequency bands are limited, multiple access modulation techniques are continuously being developed and improved to improve efficiency and capacity and to maximize use of the allocated RF spectrum. Examples of such modulation techniques include time division multiple access (TDMA), frequency division multiple access (FDMA), and code division multiple access (CDMA).

CDMA modulation employs a spread spectrum technique for the transmission of information. CDMA modulation techniques are becoming popular because they enable more users to communicate at a given time. A spread spectrum system uses a modulation technique that distributes the transmitted signal over a wide frequency band. This frequency band is typically substantially wider than the minimum bandwidth required for transmitting the signal. The spread spectrum technique is accomplished by modulating each baseband data signal to be transmitted with a unique wideband spreading code. Using this technique a signal having a bandwidth of only a few kilohertz can be spread over a bandwidth of more than a megahertz. A form of frequency diversity is obtained by spreading the transmitted signal over a wide frequency range. Since only 200–300 kHz of a signal is typically affected by a frequency selective fade, the remaining spectrum of the transmitted signal is unaffected. A receiver that receives the spread spectrum signal, therefore, will be affected less by the fade condition. In addition, spreading the signals over a large bandwidth allows system robustness against frequency selective interference, as the effect of the de-spreading process is to effectively dissipate the interference power over the entire bandwidth.

In a CDMA telephone system, multiple signals are transmitted at the same frequency. A particular receiver then determines which signal is intended for that receiver by the unique spreading code in the signal. The signals at that frequency without the particular spreading code intended for that particular receiver appear as noise to the receiver and are ignored. Because of this, it is desirable in CDMA systems to transmit at a minimum power level. Thus, CDMA systems typically employ power control algorithms to reduce the power transmission levels. By minimizing power transmission levels, interference to other signals is reduced and network capacity is maximized.

Frame erasures that occur during the data transfers are handled by a combination of power control algorithms that are applicable for packet data of any type. The power control algorithm(s) ensures that the transmission power is sufficient for the current channel conditions to meet a specified frame error rate target.

One problem that has been encountered with respect to the power control algorithms is the synchronization of the forward gain amount of a plurality of BTS's that are in simultaneous communication with a mobile station. As is known, one code division multiple access (CDMA) type of mobile station frequently communicates with a plurality of base station transceiver systems (BTS's) at once and sums the received signals to obtain a signal having adequate signal strength for processing and interpretation. Ideally, the signal strength received from each of the BTS's will be nearly equal. However, because current schemes do not provide for individualized power control commands from the mobile station to the base stations, the mobile station transmits one set of power control commands that are broadcast to all of the BTS's in communication with the mobile station at that time (the BTS's that are listed in the mobile station's active set). Unfortunately, erasures of power control signals will sometimes occur for signals resulting in a situation in which only some of the BTS's receive and respond to the power control signals. Accordingly, the forward transmission power levels, or forward gain, of the BTS's in communication with the mobile station go out of synchronization meaning that they become unequal.

The above problem is generally considered to be a difficult problem without a perfect solution under the current interfaces and standards. One solution has been to ignore the problem altogether by not attempting to synchronize the forward-link gains of the BTS's at all. Accordingly, for those approaches, narrow limits on the forward-link gain values are set on the BTS's so as to limit the amount of divergence that can occur. One problem with this approach, however, is that it limits the actual dynamic range of the forward-link gain available to the BTS's. Thus, limiting such gain limits performance. Another suggested approach is to have a base station controller periodically generate forward gain power transmission levels to each of the BTS's to synchronize them. While this approach is advantageous in that it results in synchronized BTS operation, it is problematic in that power control commands received from the mobile station are overwritten or ignored. Accordingly, a new forward gain power transmission value, as dictated by BSC, may be either higher or lower than is required for the mobile station to adequately receive the communication signals. In the scenario where the power transmission level is higher, the result is unacceptable because of the well known goal in CDMA systems to minimize power transmission levels so as to maximize through put capacity. On the other hand, if the commanded forward gain power transmission level is lower than is required by the mobile station, then the mobile station stands to lose data and to have to repeat its process of increasing the power transmission levels.

What is needed, therefore, is a method for more effectively synchronizing the forward gain power transmission levels of the plurality of BTS's in communication with a mobile station while respecting the power transmission level increases requested by the mobile station in its execution of its power control algorithms.

SUMMARY OF THE INVENTION

The present system and method of use comprises a system that solves the aforementioned problems by, in part, adjusting forward-link gain according to power control requests by the mobile station, to forward-link gain commands by the base station controller and to a determination of how to interpret the forward-link gain commands from the base station controller with respect to a history of forward-link gain settings. Accordingly, BTS's tend to become synchronized based upon forward-link gain power commands issued by the base station controller but also adjust the actual forward-link gain settings according to power control commands received from the mobile stations. Additionally, the BTS's analyze the forward-link gain commands from the BSC's with respect to a history of forward link gain power transmission levels and a history of forward link gain commands from the BSC to determine the proper adjustment to the forward link gain. As such, diversion gain settings among the various BTS's in communication with a mobile station will tend to converge notwithstanding periodic errors introduced to erasure of power control bits generated by the mobile station. While the present solution does not ensure perfectly synchronized operation among the BTS's, it does improve the synchronization without wiping out power control commands generated by the mobile station.

BRIEF DESCRIPTION OF THE DRAWINGS

FIG. 6 is a table illustrating operation of a communication network according to one aspect of the present invention.

DETAILED DESCRIPTION OF THE DRAWINGS

Code Division Multiple Access communication systems generally comprise a circuitry for generating spread spectrum communication transmissions at a defined frequency by encoding, interleaving and scrambling data bits with long pseudo random number codes. Additionally, power control bits are "punctured" in a defined manner to enable a transceiver to request or advise whether power transmission levels require increasing or decreasing.

Figure 1A:
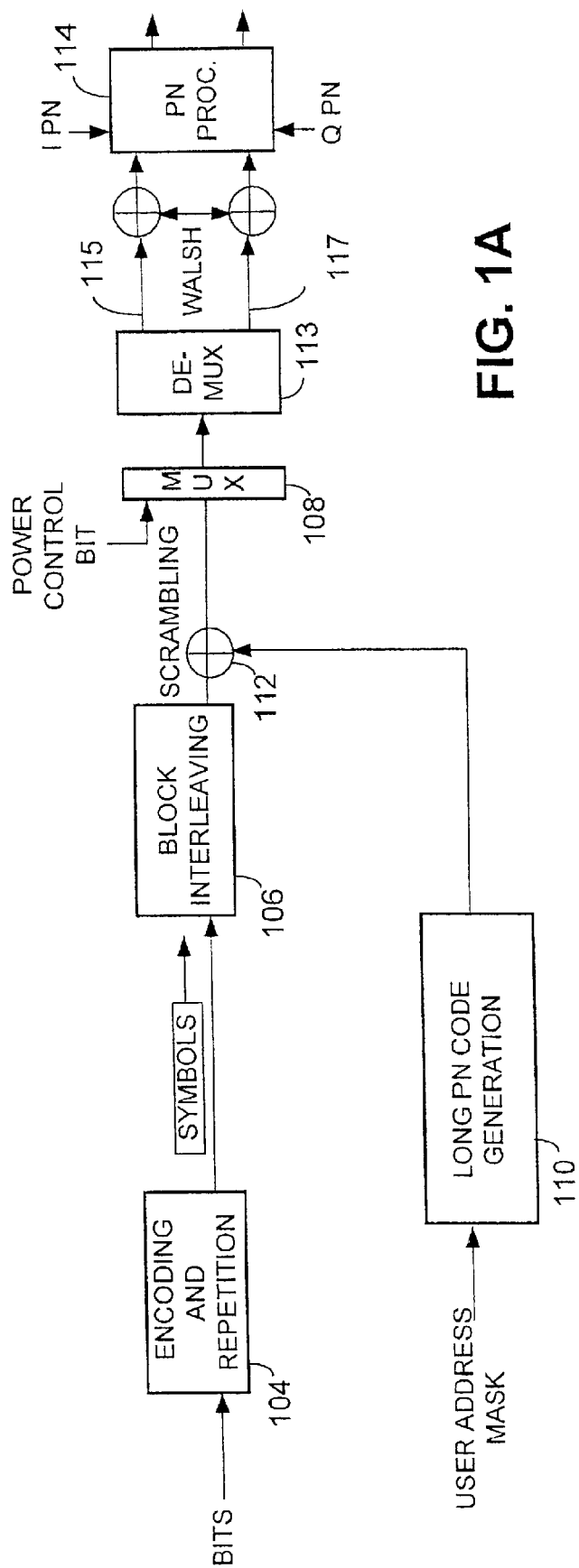
FIG. 1A is a functional block diagram that illustrates a typical CDMA transmitter system for use on the forward channel from a base station transceiver system (BTS) to a CDMA mobile station.

FIG. 1A illustrates a typical CDMA transmitter system for use on the forward channel from a base station transceiver system (BTS) to a CDMA mobile station. An encoder 104 creates a digital baseband signal by encoding a digitized signal representing an analog voice or digital data service. An encoder 104 accepts data bits in and produces code symbols on an output. For each clock cycle, a new data bit is shifted into a register of the encoder 104 and the data bit previously received is output. The various inputs of an encoder are added (modulo 2) to produce two or more symbols out for each clock cycle. Since the new symbols generated for each clock cycle are derived from the values of the new bit being input in all current data bits occupying the shift register during a given interval, a certain level of predictability can be realized. The output symbols of the encoder 104 are then produced to a block interleaver 106. Block interleaver 106 serves to create a matrix of symbols wherein each matrix represents all of the information within a defined interval. For example, in one embodiment, 384 modulation symbols may be entered into an array at a rate of 19,200 symbols per second. The array is then rearranged to create an output array to de-correlate the data and to separate adjacent symbols in time.

One advantage of this process is that the effects of bursty errors may be diminished and information eliminated by the bursty error may potentially be recovered. Moreover, in some embodiments, lower transmission rate data is repeated. Here, the lower rate repeated symbols are also separated therefore increasing the survivability of symbols to signal bit errors. In addition, the data array that is output by the block interleaver 106 is slightly modified in that defined power control bits are inserted in place of various data symbols. Power control bits are used by CDMA transmitters to indicate that power transmission levels of the transceiver with which the transmitter is communicating need to be increased or decreased. Generally, the power control bits are used for power control purposes to optimize network effectiveness.

Each symbol that is output from the multiplexer 108 is produced to a de-multiplexer 113, which passes the input bits alternately to an in-phase branch 115 and a quadrature branch 117. Each symbol that is output from the de-multiplexer 113 is exclusively ORed with an assigned Walsh function. The Walsh function is what, in a CDMA context, creates the channels of communication. Stated simply, each symbol is added across a defined bit sequence Continuing to refer to FIG. 1, a long PN code generator 110 generates long pseudo random number (PN) sequences to generate user-specific sequences of symbols. The Walsh code spread symbols from the combiner 112 are then spread in quadrature. The symbols are input to two Exclusive OR combiners to generate a pair of short PN sequences. The first combiner exclusively ORs the Walsh code spread symbols on the in-phase branch 115 with the end phase sequence while the second combiner exclusively ORs the Walsh code spread symbols on the branch 117 with the quadrature phase (I) and (Q) sequences. The I and Q sequences are then produced to a PN processor 114 that, in turn, produces the final In Phase and Quadrature chip sequences for transmission.

The resulting I and Q channel code spread sequences are used to bi-phase modulate a quadrature pair of sinusoids by driving the power level of the pair of sinusoids. The sinusoidal output signals are then processed for transmission by an antenna. These signals are then transmitted with frequently changing forward gain transmission power levels according to BSC power gain commands and to mobile station power control commands that request upward and downward forward gain adjustments by defined step sizes.

Figure 1B:
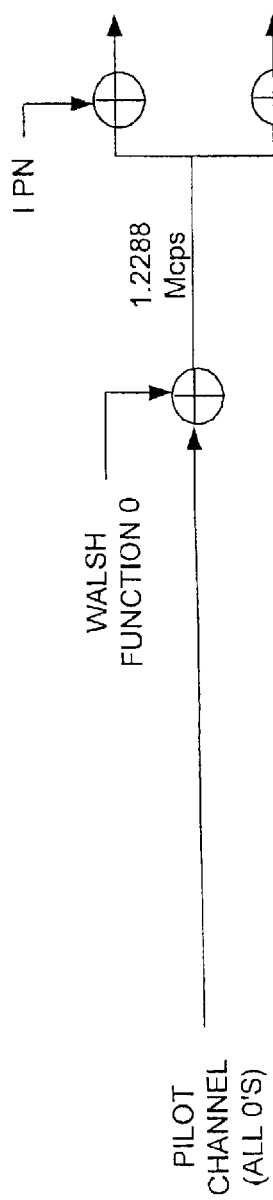
FIG. 1B is a functional block diagram illustrating the operation of a pilot channel.

FIG. 1B is a functional block diagram illustrating the operation of a pilot channel. The pilot channel is a reference channel transmitted on the forward-link that mobile stations use for acquisition, timing, and as a phase reference for coherent demodulation. The pilot channel signal is transmitted at all times by each base station on each active CDMA frequency. Each mobile station continuously tracks the pilot signal. Unlike long code sequences, pilot channel sequences are repeated many times every few seconds. For example, in one known system, the pilot sequence is repeated 75 times every two seconds. Not only does this aid a mobile station in its initial acquisition when it powers up, but also ensures rapid detection of cells or base station transceiver systems that form good handoff candidates.

All base stations share the same PN sequence for the pilot channel. However, each base station transmits the pilot channel at a unique phase offset value. Thus, the timing of the pilot channel provides tracking of a timing reference for a given base station and phase reference. The phase separation provides for extremely high reuse within one CDMA channel frequency. The uncoded nature of the pilot signal facilitates acquisition by the mobile stations in addition to the short duration of the pilot PN sequence.

In one described embodiment, the pilot channel is sent unmodulated, and is orthogonally spread with a Walsh function zero to ensure that it is easily recognized. Quadrature spreading and channel filtering occur exactly as discussed for all forward channel traffic.

Figure 2:
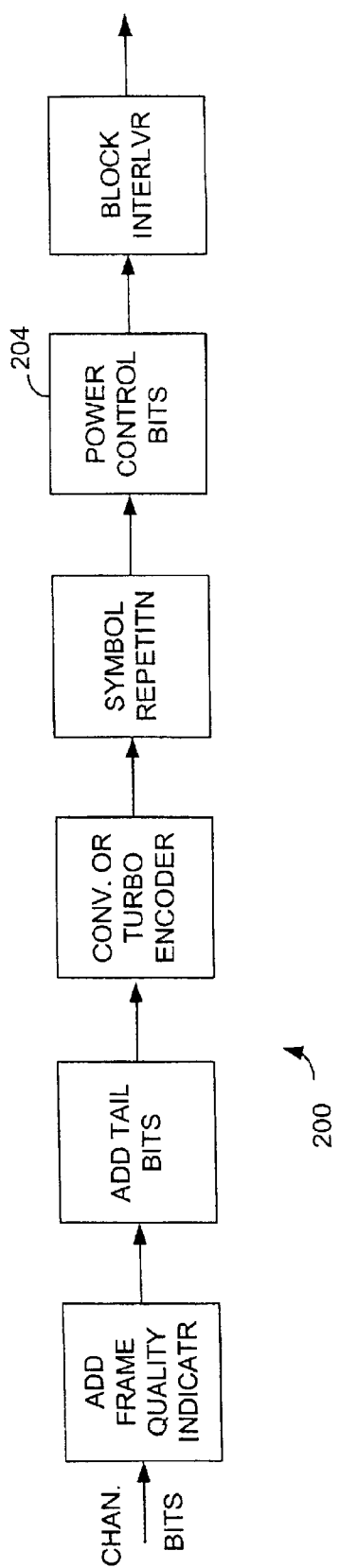
FIG. 2 is a functional block diagram that illustrates a typical CDMA transmitter system for use on the reverse channel from a CDMA mobile station to a BTS.

FIG. 2 is a functional block diagram that illustrates operation of a reverse link transmitter, and, more particularly, the operation of reverse link power control. As may be seen, power control bits are transmitted in the reverse link symbol stream in system 200 by block 204 to indicate to a base station whether power transmission levels may be increased or decreased. Operationally, a mobile station power control algorithm typically requests power transmission level increases whenever a signal quality exceeds a specified threshold. It is these punctured power control bits that, when not received by a particular BTS, cause the particular BTS to have a divergent transmission power level. In some CDMA systems, the power control bits are punctured into the symbol stream for the reverse link. In newer CDMA systems, however, current designs may well include having dedicated signals for enabling the mobile station to request power increases and decreases for the forward link.

Figure 3A:
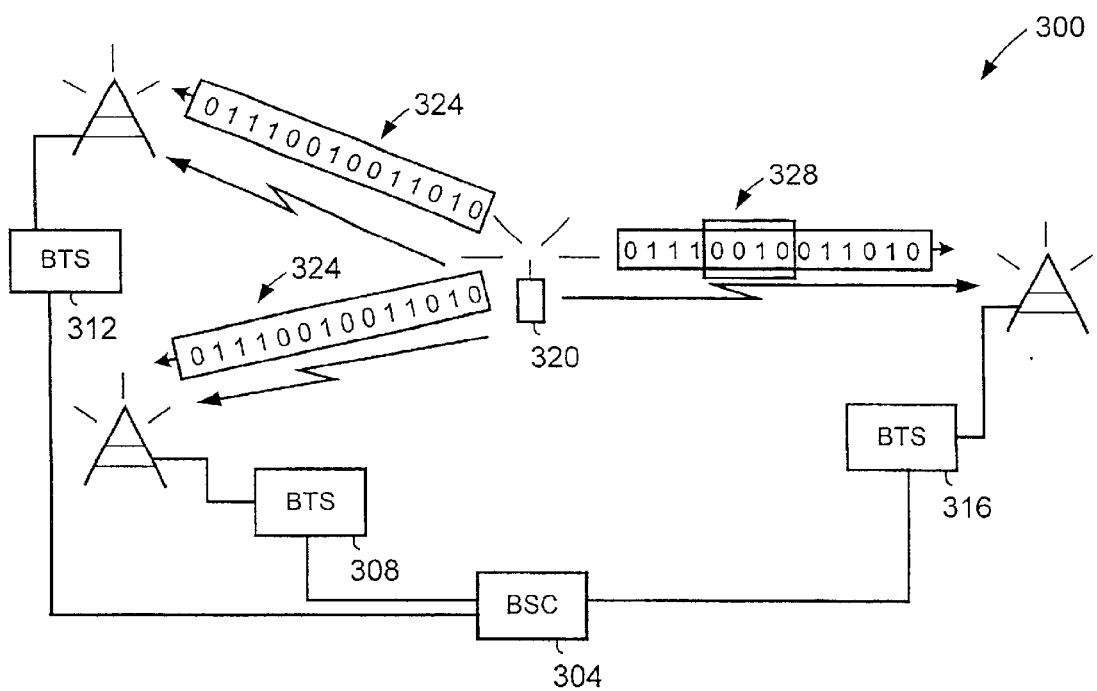
FIGS. 3A and 3B illustrate system operation with respect to the transmission of power control bits by a mobile station and the resulting responses of the plurality of BTS's resulting from erasure of some power control bits.
Figure 3B:
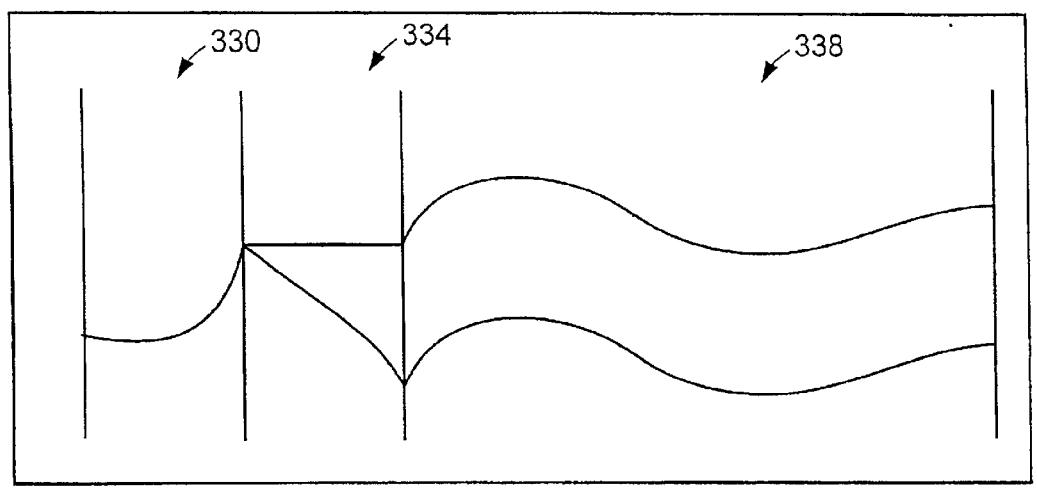

FIGS. 3A and 3B illustrate system operation with respect to the transmission of power control bits by a mobile station and the resulting responses of the plurality of BTS's resulting from erasure of some power control bits. More specifically, referring now to FIG. 3A, a network 300 comprises a base station controller 304 that is coupled to communicate with a BTS 308, a BTS 312, and a BTS 316. Each of the BTS's 308, 312 and 316 communicate over a wireless communication link with mobile station 320. In the example shown, mobile station 320 transmits a sequence of power control bits shown generally at 324 that are to be received by each of the BTS's 308, 312 and 316. As is understood by those skilled in the art, BTS's 308, 312 and 316 are those BTS's that are listed in the active list of mobile station 320. Stated differently, each of the BTS's 308, 312 and 316 are in communication with mobile station 320 to transmit communication signals thereto and to receive communication signals therefrom. Mobile station 320 sums the communication signals received from each of the BTS's 308, 312 and 316 to create a received signal for processing.

Continuing to refer to the sequence of power control bits shown generally at 324, it may be seen that each of the power control bits of the sequence of power control signals 324 is received by BTS's 308 and 312. A series of power control bits, as shown generally at 328, are erased due to interference and are not received BTS 316. For simplicity, only power control bits are shown. It is understood that other signaling may accompany the power control bits. Accordingly, as may be seen, BTS 316 does not receive at least one power control bit and therefore becomes unsynchronized with respect to the other BTS's.

FIG. 3B illustrates the resulting BTS operation, and more specifically, the divergence that can occur to the forward gain of the BTS's as a result of an erasure of power control bits transmitted by a mobile station as illustrated in FIG. 3A. More specifically, referring now to FIG. 3B, a first portion 330 of the forward link gain curves of FIG. 3B shown that the gains are (approximately) synchronized and respond similarly to power control commands by a mobile station. A second portion of the curves shown generally at 334 illustrate the divergence that occurs as the forward link gain curves take on different shapes as a result of the erasure of the bits shown at 328 in FIG. 3A.

In the portion of the curve shown generally at 334, the forward link gain for BTS 316 changes in a random or unpredictable manner. In the example of FIG. 3B, the response is shown to be a "flat" line in portion 334 of the curve to illustrate divergence from what it should have been. The line is further shown as flat to account for an average response due to the unpredictability of the response that is due to the erasure since it is not receiving any power control bits to increase or decrease it forward link gain.

The forward link gain of the other BTS's, e.g., BTS 312 is reduced, on the other hand, as a result of the "zero" power control bits received by it. The present example of FIGS. 3A and 3B presumes that a zero is a command by the mobile station to reduce power while a one is a command to increase power.

In the third portion of the curve shown generally at 338, the forward link gain curves of BTS's 312 and 316 have a similar shape although they are separated by a constant difference that resulted from BTS 312 reducing its power while BTS 316 kept its power level at a constant value as a result of the erasure of the power control bits that it should have received. Thus, as may be seen, in the portion of the curves shown generally at 338, a constant divergent amount is realized between the BTS's 316 and 312. This effect occurs because the BTS's in this portion of the curve are all receiving the power control bits and are responding similarly.

Figure 4:
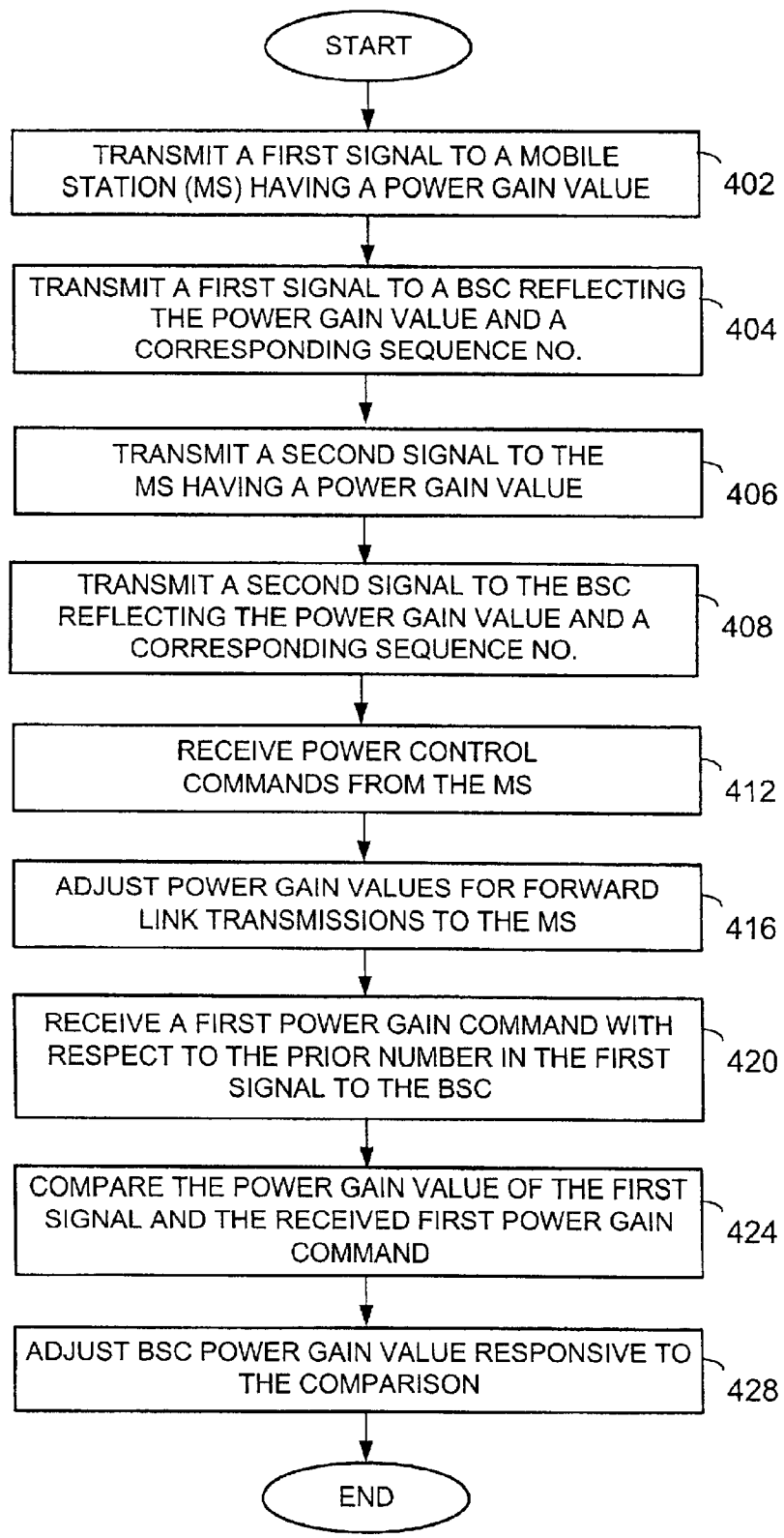
FIG. 4 is a flow chart illustrating a method for power control according to one embodiment of the present invention.

FIG. 4 is a flow chart illustrating a method for power control according to one embodiment of the present invention. Generally, the method of FIG. 4 is one that illustrates a method of informing a BSC of the power gain values for forward link transmissions in a way that enables a BTS to make adjustments in its power control without erasing adjustments due to power control commands issued by the mobile station.

Initially, a BTS transmits a communication signal (in a forward link) to a mobile station in which the transmission is characterized in part by a power gain level (step 402). Whenever a BTS transmits a communication signal to a mobile station, it also transmits a first status signal to a base station controller that reflects the power gain value and a first sequence number (step 404). The base station controller uses the forward gain value and the sequence number that it receives from each of the base station transceiver systems to determine a forward gain value that it should use to command each of the BTS's in communication with a mobile station.

Thereafter, the BTS transmits a second communication signal to the mobile station characterized by a second power gain value (step 406) and a second status signal to the BSC that reflects the second power gain value and the second sequence number (step 408). While the method of FIG. 4 shows only a second transmission of a forward gain value and sequence number to the BSC, it is understood, of course, that multiple other transmissions may occur immediately after the transmission of the second forward gain value and sequence number before a power command is received from the base station controller.

Additionally, from the time that a first transmission is made to the base station controller with the forward gain value and first sequence number, the BTS may also receive power control step commands from the mobile station (step 412). Accordingly, the BTS adjusts its forward gain value for subsequent transmissions to the mobile station (step 416). Thus, by way of example, if the BTS received the power control step command from the mobile station prior to step 408, then the second forward gain value and sequence number transmitted to the BSC would reflect the new forward gain value resulting from the adjustment due to the command from the mobile station.

Thereafter, the BTS receives a power gain command from the base station controller with respect to a sequence number (step 420). The BTS then compares the actual and commanded power gain values for the first sequence number (step 424). The forward gain value is adjusted responsive to the commanded power gain values in relation to actual power gain values and previously commanded power gain values (step 428). By tracking power gain values in relation to a sequence number, a BTS can adjust the forward gain by an amount that is based upon the difference in the commanded power gain and the actual forward gain for a given sequence number, among other factors, and not lose adjustments in forward gain due to mobile station power control commands. Thus, mobile station triggered adjustments are not overwritten with a "hard reset". Stated differently, the forward gain value is adjusted to correspond to the commanded power level as well as the sum of each of the steps commanded by the mobile.

One aspect emphasized by the embodiment of FIG. 4 is that sequence numbers are utilized to enable a BTS to avoid having to overwrite MS commanded power control adjustments with a hard reset. Many different algorithms may be implemented to account for power gain adjustments due to mobile station commands as well as to power gain values commanded by a BSC in relation to prior transmissions identified by a sequence number. Some of the different algorithms shall be described in better detail elsewhere herein. Additionally, the steps of FIG. 4 are shown in the order listed as an example of BTS operation. It is understood that the process steps of FIG. 4 may be performed in a different order and may include additional steps.

Figure 5:
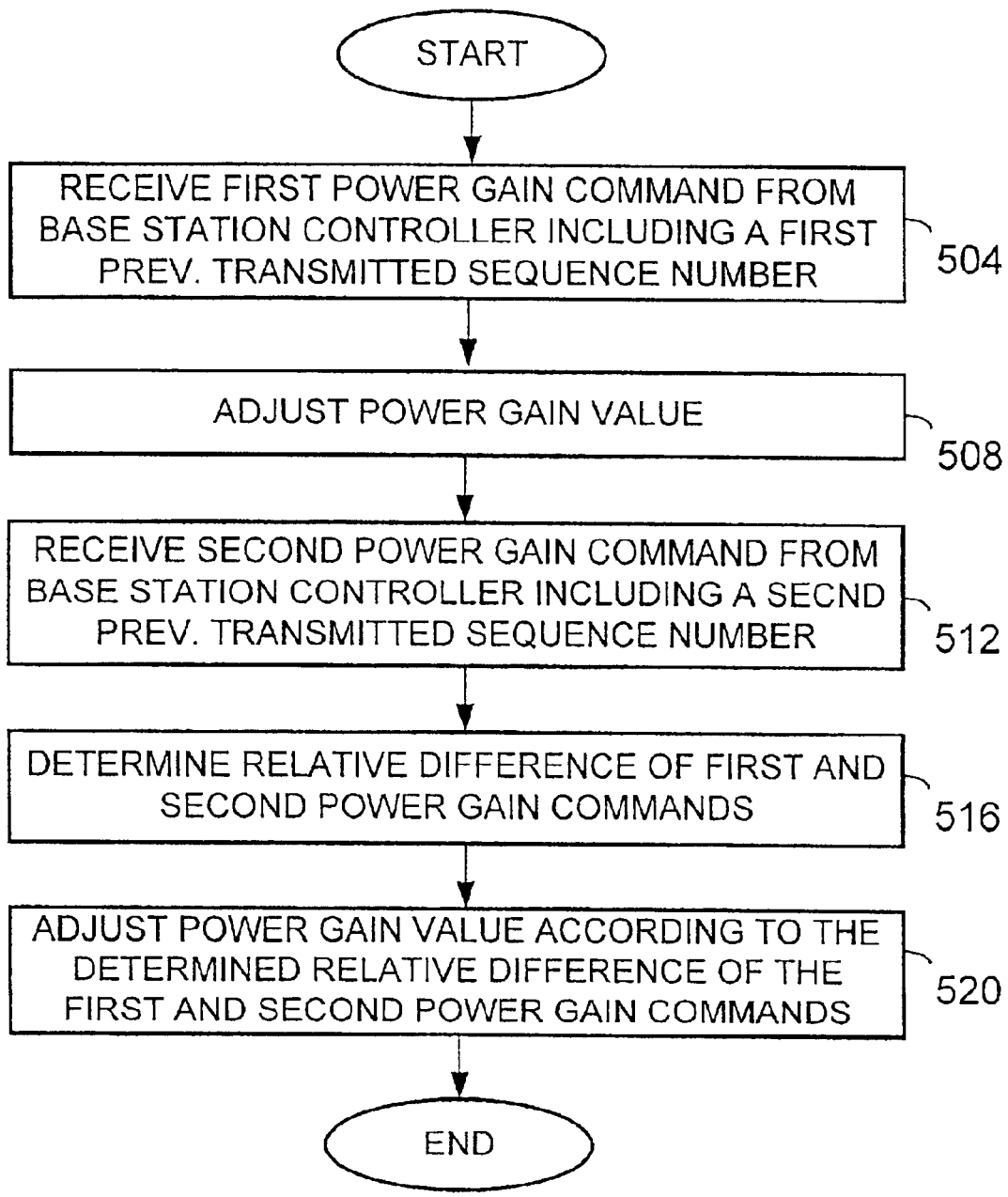
FIG. 5 is a flow chart illustrating a method for power control according to one embodiment of the present invention.

FIG. 5 is a flow chart illustrating a method for power control according to one embodiment of the present invention. Referring now to FIG. 5, a base station transceiver system initially receives a power gain command from a base station controller (step 504). The power gain command from the base station controller further includes a sequence number that relates to a sequence number previously transmitted by the BTS. Thus, the power gain command from the BSC indicates the forward gain value that should be used for subsequent transmissions. Typically, the BSC will evaluate all of the forward gain values for a given sequence number from each of the BTS's to arrive at a power gain command value that it generates to each of the BTS's. Accordingly, after receiving the power gain command from the BSC, the BTS, as well as the other BTS's, adjusts its forward gain transmission level (step 508). Thereafter, the BTS receives a second power gain command from the BSC (step 512). The BTS then determines the difference in the relative value of the current and prior power gain commands (step 516). In addition to determining the relative difference in the prior power gain commands, an alternate embodiment includes determining and accounting for prior adjustments resulting from power gain level increases and decreases requested by the mobile station. After analyzing the various adjustments to the power gain values, the BTS adjusts the power according to its particular implemented algorithm (step 520).

One aspect of the method of FIG. 5 is that the power gain commands are identified in relation to the sequence numbers. Thus, in order to avoid duplicative increases due to system lag times, step 516 contemplates, for example, determining the relative differences between subsequent power gain commands and adjusting the power accordingly. For example, a BTS will adjust its power gain value significantly when it receives its first commanded power gain value from the BSC. Thereafter, however, the BTS will analyze differences between a previous power gain value that was commanded with the most recent power gain value received as a part of determining an appropriate power gain value for the next transmission of a communication signal. For example, if a second power gain command has a difference of five units between it and its corresponding forward gain value having the same sequence number, then the difference between the power gain commands is minus one unit if the difference between the first power gain command and the actual power gain of the first transmission is six units. Accordingly, the BTS would increase its power gain in a manner that accounts for this change of minus one unit responsive to the second power gain command. Other factors or determinations may influence the power gain value for the next transmission including, for example, any increase or decrease requests from the mobile station.

The method of FIG. 5 describes the adjustment of the power gain level according to the first and second power gain commands. One aspect of one embodiment of the present invention, however, includes setting the power gain level to a determined value rather than the commanded value. Rather than setting the power gain level to the first received power gain command after receiving the first power gain command, the BTS determines a difference between the power gain command and the power gain level having a corresponding sequence number. Thus, any power gain level adjustments made as a result of power control commands by a mobile station are not wiped out by a "hard reset" that would occur if the BTS were to set the power gain level to the commanded amount.

FIG. 6 is a table illustrating operation of a communication network according to one aspect of the present invention. Referring now to FIG. 6, it may be seen that a plurality of columns of the table shown generally at 600 includes a column 604 for carrying sequence numbers, a column 608 for listing a power gain value reported to the BSC in relation to the sequence number of column 604, a column 612 reflecting a power control command from a mobile station, a column 616 for illustrating the result from the change due to the mobile station command reflected in column 612, a column 620 indicating a power gain command provided by the BSC, a column 624 for identifying the difference between the value of column 620 and its corresponding actual power gain transmission level identified in column 608 by the corresponding sequence number of column 604, a column 628 reflecting the changes in the BSC commanded power gain values relative to the prior commanded power gain value and, finally, a column 632 that reflects the resulting power gain value for the next transmission of a communication signal to the mobile station.

Table 600, as may be seen, contains two portions divided by a horizontal line 652. Those forward gain values shown above line 652 and their corresponding sequence numbers are those that were transmitted prior to receiving a first power gain command from a BSC. Thus, the only adjustments to the forward gain value for those transmissions result from power control commands received by a mobile station as shown in column 612.

Examining the numbers that are in Table 600, for sequence number zero, as is shown in Row 636, the forward gain value is 3 and a subsequently received power command value by the mobile station including a "1" indicating that the BTS is to increase the forward gain by a defined step. Because of backhaul delays, the BSC power command value shown correlating to sequence number 0, is not actually received until after the moment in time represented by line 652. Thus, the system reaction from receiving that power command from the BSC for sequence number 0 does not occur until, time wise, the system has crossed line 652 and after a series of power control commands have been received by the mobile as will be explained later and as shown in column 612, rows 636 through 648.

Continuing to refer to Table 600, Row 640, having sequence number 1 shows a reported forward gain value of 4. As was stated before, the mobile station sent a power control command to increase the power by a defined step size after the transmission identified by sequence number 0. Responsive thereto, the forward gain value is increased from a forward gain value of 3 to a value of 4.

After the transmission identified by sequence number 1 in Row 640, another power control command is received from the mobile station to increase the forward gain as reflected in Row 640, Column 612. Accordingly, as is shown in Row 644, for the transmission of sequence number 2, the forward gain value has been increased to a value of 5. Thereafter, however, a mobile station power command signal is to decrease the power gain as reflected by the "–1". It is understood, of course, that any Boolean defined logical value may be used to represent increase and decrease commands. Here, they are shown as "1" for an increase request and a "–1" for a decrease request to facilitate the explanation of the present embodiment of the invention.

Responsive to receiving the command to decrease the power by a defined step size, the power transmission described by sequence number 2 in Row 644 results in a forward gain value of 4 as shown in Row 644, Column 616. Thereafter, however, the mobile station requests an increase of one as is shown in Row 648, Column 612 to result in a power gain value of 5 as shown in column 616.

After the mobile station requests a power increase as indicated in Row 648, Column 616, the forward gain is increased back to 5. After this increase, however, a power gain command is received from the base station controller as shown in Row 656, Column 620. The power gain command is for the BTS to transmit at a power gain level of 9.

The power gain command of Row 656, Column 620 is responsive to the BTS reported power gain value of 3 for sequence 0 as shown in Row 636, Column 608. Accordingly, the delta or difference between the two is listed in Row 656, Column 624. Here that difference is a value of 6. It is shown as "6(0)" to reflect that the difference relates to the reported value having a sequence number of "0". Thus, the present forward gain value of the mobile station should be increased, according to the described embodiment of the present invention of FIG. 6, in response to the base station command, by the sum of the values of Row 656, Column 624 and Column 616. As Column 616 reflects power gain values that would result from increase and decrease requests from the mobile station, the request for a decrease in power was that was received from the mobile station as identified in Row 656, Column 612 after the transmission identified by sequence number 4 but prior to the transmission identified by sequence number 5 is included in the resulting power gain value of Column 632.

After receiving the BSC commanded first power gain value as shown in Row 656, Column 620, the BTS sets the power gain value to 10 as is shown in Column 632. Thereafter, as shown in Column 660, the mobile station requests a power transmission decrease. Additionally, the subsequent power gain command of 9(1) as shown in Column 620 yields a difference from the actual power gain value of 5 for sequence number 1. The change in the difference is a –1 as is reflected in Column 628. Accordingly, the power gain value that was last used as reported in Column 608 is reduced from 10 to a value of 8 as a result of summing the values from Columns 608, 612 and 628.

Similarly, in Row 664, the mobile station requests yet another decrease. Thus, the relative difference shown in Column 628 is 0 and the power gain value is decreased by 1.

Thereafter, as shown in Row 668 the mobile station requests an increase of 1 and the relative difference shown in Column 628 is 1. Thus, the power gain value is increased by 2 to a value of 9 as is shown in Column 632.

As may be seen, the table of FIG. 6 illustrates several inventive aspects of the present invention. First, forward gain values are a function of not only the mobile station requested power transmission level increases and decreases, as exemplified in Column 612, but also by the differences in commanded forward gain values received from the base station controller. In the example of FIG. 6, the first commanded forward gain value in the first power gain command was 6 units higher than its corresponding forward gain value. Since there had been no previous forward gain values commanded by the BSC, the difference between this power gain command and a previous power gain command was equal to 6. Thereafter, the system increases or decrease forward gain values based upon the difference between the present and the previous forward gain value received from the BSC (in addition to commands by the mobile station). This particular embodiment preserves the adjustments made to the power gain level as a result of mobile station power control commands. Thus, power gain levels may be calculated according to adjustments due to mobile station generated power control commands as well as relative differences between actual power gain commands and corresponding and subsequent power gain commands issued by a BSC.

In the embodiment shown in FIG. 6, the BTS always responds to power gain commands from the BSC and the mobile station. In an alternate embodiment, however, the BSC readjusts is forward gain value to merely reflect a changed due to the commanded forward gain value from the BSC the first time it receives a commanded value. Thereafter, the forward gain values are responsive to both the BSC commands and the mobile station commands as described herein. One reason for this approach is that the step size is so large (potentially) from the first adjustment to the BSC commanded value relative to a mobile station commanded power increase or decrease.

In the described embodiment of the invention, one minor aspect of the invention includes the following change to the above described algorithm. Namely, whenever a commanded value matches either historical value for a given sequence number, then the power gain level is only adjusted to respond to power gain commands from the mobile station. For example, if the BSC commanded power gain level in Row 672, Column 620 is equal to either 5 or 10 for sequence number 4, then the only response would be to adjust the power according to a request by the mobile station.

Figure 7:
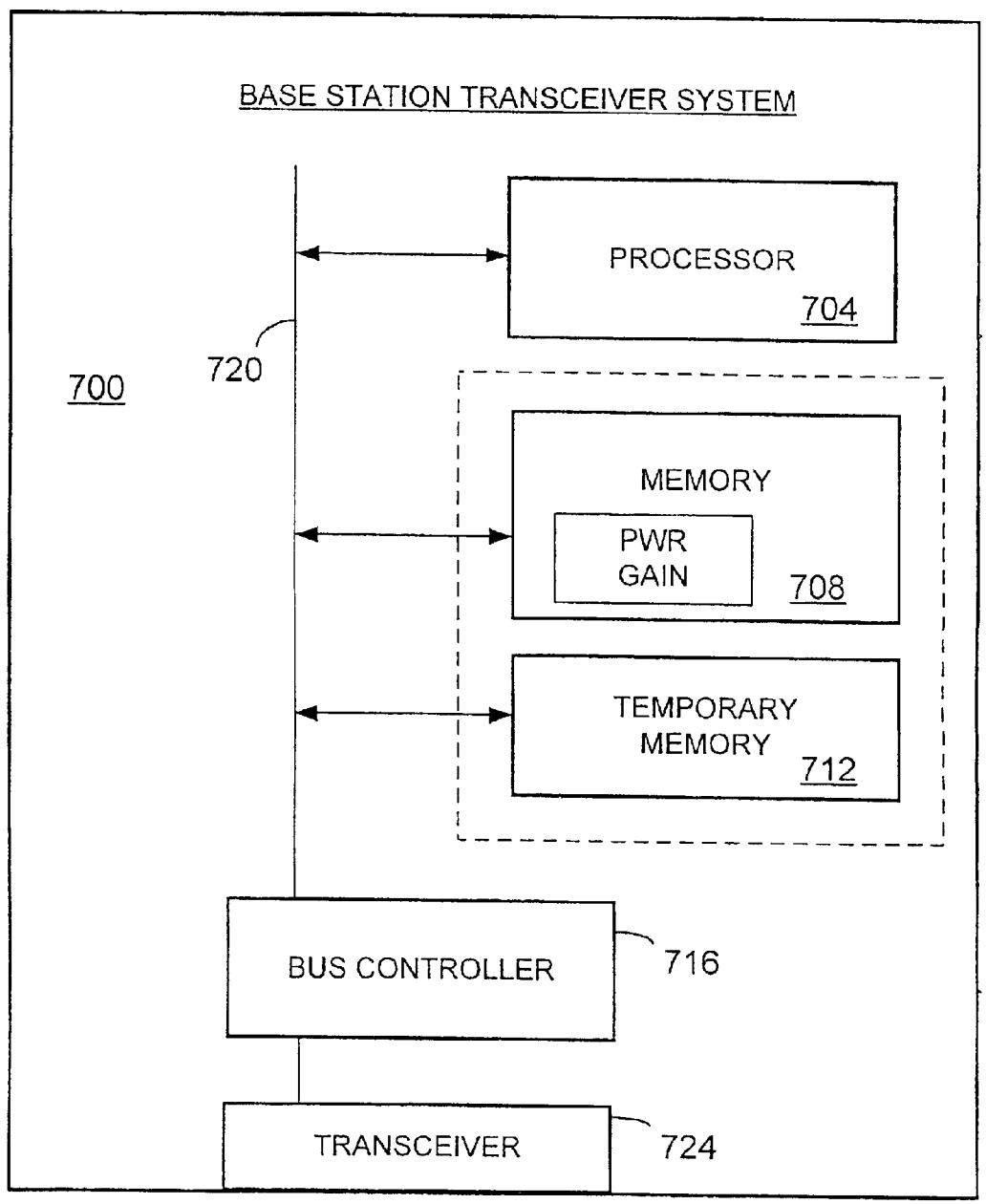
FIG. 7 is a functional block diagram of a base station transceiver system according to one embodiment of the present invention.

FIG. 7 is a functional block diagram of a base station transceiver system according to one embodiment of the present invention. BTS 700 includes a processor 704 that is coupled to communicate with a memory 708, a temporary memory 712, and a bus controller 716 over an internal bus 720. Bus controller 716 is coupled to a transceiver 724 for transmitting and receiving communication signals and other communication signals to and from at least one external device.

Memory 708 includes computer instructions that define operational logic to enable the BTS to determine a forward gain value according to the power gain commands received from a base station controller and from a mobile station as is described herein. Thus, the computer instructions define logic to adjust the forward gain values in a way that accounts for mobile station power increase/decrease requests and that also accounts for power gain commands in a relative manner. More specifically, the BTS examines the differences in power gain commands from the BSC in order to determine a next forward gain value as is described herein.

In operation, BTS 700 receives computer instructions over bus 720 from memory 708 and executes the instructions to perform the logic defined by the instructions. As necessary, processor 704 stores temporary parameters and data values in temporary memory 712 while executing the computer instructions in memory 708. By way of example, processor 704 stores a sequence of power gain commands from the base station controller in temporary memory 712 so that it may determine the relative differences in power gain commands.

Memory 708 further includes computer instructions that define routine BTS operational logic. Accordingly, when BTS 700 is to transmit communication signals to a mobile station, is executes the computer instructions within memory 708 to determine that it should transmit a communication signal and to determine the corresponding transmission power level. Accordingly, the BTS 700 transmits the signals through transceiver 724.

While the invention is susceptible to various modifications and alternative forms, specific embodiments thereof have been shown by way of example in the drawings and detailed description. It should be understood, however, that the drawings and detailed description thereto are not intended to limit the invention to the particular form disclosed, but on the contrary, the invention is to cover all modifications, equivalents, and alternatives falling within the spirit and scope of the present invention as defined by the claims. For example, the circuitry described herein may be formed of electrical or optical components or a combination thereof. Additionally, the logic of the above-described invention may be formed in hardware or defined by computer instructions stored in memory and executed by a processor as described herein.

For example, the relationship of forward gain values resulting from requests by a mobile station may be adjusted with respect to the received forward gain values from the base station controller. The described embodiments may be modified in many different ways without departing from the scope or teachings of the invention.

What is claimed is:

1. A base station transceiver system (BTS) in communication with a mobile station (MS) and with a base station controller (BSC), comprising:

circuitry that defines logic that prompts BTS to generate a sequence number that relates to the previous forward link transmission gain level and to transmit the sequence number with the status signal to the BSC;

circuitry for receiving and processing power gain commands from the mobile station;

circuitry for receiving and processing power gain commands from the BSC wherein the power gain commands from the BSC are made in relation to the previous forward link transmission as identified by the sequence number; and circuitry that defines logic for comparing power gain commands received from the BSC in relation to transmitted power gain levels and for adjusting the BTS's forward gain level for a subsequent transmission wherein the gain level adjustment is based upon a difference between the commanded gain level and the gain level for the previous forward link transmission as identified by the sequence number and further wherein the difference is added to a current gain level.

2. The BTS of claim 1 wherein the circuitry that defines logic for adjusting the BTS power gain level also defines logic for adjusting the BTS power gain level according to power control commands received from the MS in relation to the sequence number.

3. The BTS of claim 1 wherein the circuitry that defines logic for adjusting the BTS's power gain level in a manner that previous power control commands received from the mobile station are not erased as a result of the BTS receiving a power gain command from the BSC.

4. The BTS of claim 1 wherein the circuitry that defines logic for adjusting the BTS's power gain level includes a processor coupled to communicate with a memory wherein the memory includes computer instructions that define the operational logic for adjusting the BTS's power gain level.

5. The circuitry of claim 4 wherein the circuitry that defines logic for adjusting the BTS's power gain level includes logic circuitry whereby the logical operation of the circuitry is defined in hardware.

6. A method for adjusting power gain levels for forward link transmissions for a BTS, comprising:

transmitting a forward gain status signal to a BSC, which forward gain status signal includes a first portion defining a forward gain level and a second portion that defines a sequence number;

receiving at least one power control command from a mobile station;

receiving a power gain command from the BSC, which power gain command comprises a first portion defining a commanded power gain level and a second portion including the sequence number; and adjusting the power gain level.

7. The method of claim 6 wherein the step of adjusting the power gain level includes determining a difference between the first portion of the power gain status signal and the first portion of the commanded power gain level.

8. The method of claim 7 wherein the step of adjusting the power gain level includes receiving a power control command from a mobile station and adjusting the power gain level responsive to the power control command from the mobile and responsive to the commanded power gain level from the BSC.

9. The method of claim 7 wherein the step of adjusting the power gain level includes receiving a plurality of power control command from a mobile station since the status signal was transmitted and adjusting the power gain level responsive to the plurality of power control commands from the mobile station and responsive to the commanded power gain level from the BSC.

10. The method of claim 6 wherein the step of adjusting the power gain level includes receiving a plurality of commanded power gain level signals from the BSC and determining a difference between the first portion of the last two received commanded power gain level signals wherein the power gain level is adjusted responsive to the determined difference.

11. The method of claim 10 further including the step of only adjusting a power gain level responsive to a mobile station request if a commanded power gain level from the BSC is equal to a reported value or an adjusted value for a given sequence number transmission.

12. A method in a base station transceiver system (BTS) for adjusting a forward gain of a forward link, comprising:
  transmitting a plurality of status signals to a base station controller (BSC) that include a sequence number and a corresponding forward link transmission power level for a transmission to a mobile station;
  receiving from the BSC at least one power gain command signal wherein each received power gain command signal corresponds to one of the previously transmitted status signals;
  receiving at least one power control command from a mobile station; and
  adjusting the forward gain of the forward link responsive to the at least one power gain command and to the at least one power control command based upon a difference between a BSC commanded power level and forward link transmission power level corresponding to the sequence number to prevent erasure of mobile station commanded power levels.

13. The method of claim 12 wherein the method includes receiving a first power gain command and wherein the power gain is adjusted to be a sum of a difference between the first power gain command and a forward gain value defined within the status signal.

14. The method of claim 13 wherein the method includes receiving a second power gain command and wherein the power gain is adjusted to be a sum of the difference between the first and the second power gain commands.

15. The method of claim 12 wherein a plurality of power control commands are received from the mobile station and wherein the power gain level is adjusted responsive to the plurality of power control commands and the first power gain command.

16. The method of claim 12 wherein the power gain level is adjusted to add the difference of the values of the power gain level specified in the first two part power gain level command and in a corresponding forward gain value.

17. The method of claim 16 further including receiving a second two part power gain level command wherein a current power gain level is adjusted by adding the difference between the commanded power gain levels of the first and second two part power gain level commands.

18. A method for adjusting a forward gain level for a forward link in a wireless communication network, comprising:
  receiving a first two part power gain level command from a base station controller, the first two part power gain level command including a power gain level and a sequence number;
  receiving a second two part power gain level command from a mobile station, the second two part power gain level command including a power gain level and a sequence number; and
  adjusting the power gain level based upon a difference between the first two part power gain level command and the second two part power gain level command.

19. A method for adjusting a power gain level for a forward link in a wireless communication network, comprising:
  receiving a power gain command from a BSC that is based upon a prior forward link transmission as identified by a first sequence number;
  receiving at least one power command signal from a mobile station that is based upon a prior forward link transmission as identified by a second sequence number; and
  adjusting the power gain level based upon a difference in the power gain command from the BSC and the prior forward link transmission power level without disregarding the at least one power command signals from the mobile station.

20. The method of claim 19 further including receiving a second power gain command from the BSC wherein the adjusting step includes adjusting the power gain level responsive to the at least one power command signals from the mobile station and to a difference between the first and second power gain commands.

* * * * *